United States Patent
Gensch et al.

(10) Patent No.: US 8,800,921 B2
(45) Date of Patent: Aug. 12, 2014

(54) STRUCTURAL COMPONENT AND FUSELAGE OF AN AIRCRAFT OR SPACECRAFT

(75) Inventors: Hinnik Gensch, Hamburg (DE); Thorsten Roming, Himmelpforten (DE)

(73) Assignee: Airbus Operations GmbH, Hamburg (DE)

( * ) Notice: Subject to any disclaimer, the term of this patent is extended or adjusted under 35 U.S.C. 154(b) by 1022 days.

(21) Appl. No.: 12/678,653

(22) PCT Filed: Jun. 11, 2008

(86) PCT No.: PCT/EP2008/057272
§ 371 (c)(1),
(2), (4) Date: May 10, 2010

(87) PCT Pub. No.: WO2009/037006
PCT Pub. Date: Mar. 26, 2009

(65) Prior Publication Data
US 2013/0187001 A1    Jul. 25, 2013

Related U.S. Application Data

(60) Provisional application No. 60/994,296, filed on Sep. 18, 2007.

(30) Foreign Application Priority Data

Sep. 18, 2007 (DE) .......................... 10 2007 044 389

(51) Int. Cl.
*B64C 1/06* (2006.01)
*B64C 1/12* (2006.01)

(52) U.S. Cl.
USPC .......................... 244/119; 244/131; 248/214

(58) Field of Classification Search
USPC ................ 244/119, 131, 118.1, 118.5, 171.8; 248/214, 215, 309.1
See application file for complete search history.

(56) References Cited

U.S. PATENT DOCUMENTS

| 1,922,371 A | 8/1933 | Jones |
| 2,755,216 A | 7/1956 | Lemons |
| 2,941,760 A | 6/1960 | Griffith |
| 3,087,982 A * | 4/1963 | Hayes .......................... 174/546 |

(Continued)

FOREIGN PATENT DOCUMENTS

| EP | 284570 A1 * | 9/1988 |
| FR | 883527 | 7/1943 |

(Continued)

OTHER PUBLICATIONS

Decision on granting the Patent for the Invention.

(Continued)

*Primary Examiner* — Tien Dinh
*Assistant Examiner* — Michael Wang
(74) *Attorney, Agent, or Firm* — Greer, Burns & Crain Ltd.

(57) ABSTRACT

A supporting component is provided for reinforcing the skin of an aircraft or spacecraft, for example a stringer or former, this component being configured as a closed profile (hollow profile), such that a system medium (M) can be conducted through the structural component. In this respect, the hollow profile itself serves as a load-bearing component.

11 Claims, 3 Drawing Sheets

(56) References Cited

U.S. PATENT DOCUMENTS

| | | | |
|---|---|---|---|
| 4,726,426 A | 2/1988 | Miller | |
| 5,893,534 A * | 4/1999 | Watanabe | 244/119 |
| 6,883,753 B1 | 4/2005 | Scown | |
| 7,059,565 B2 * | 6/2006 | Scown et al. | 244/117 R |
| 7,380,754 B2 * | 6/2008 | James et al. | 244/135 R |
| 7,850,117 B2 * | 12/2010 | Lohwasser et al. | 244/119 |
| 8,366,043 B2 * | 2/2013 | Stephan | 244/119 |
| 2005/0082431 A1 | 4/2005 | Scown et al. | |
| 2011/0233336 A1 * | 9/2011 | Dervault et al. | 244/119 |

FOREIGN PATENT DOCUMENTS

| | | |
|---|---|---|
| JP | 8150930 | 6/1996 |
| JP | 2009523644 | 6/2009 |
| RU | 2176970 | 12/2001 |
| SU | 6941 | 10/1928 |
| WO | 2007082644 | 7/2007 |

OTHER PUBLICATIONS

Japanese Notification of Reasons for Refusal, Nov. 6, 2011.

* cited by examiner

STRUCTURAL COMPONENT AND FUSELAGE OF AN AIRCRAFT OR SPACECRAFT

CROSS-REFERENCE TO RELATED APPLICATIONS

This application claims the benefit of U.S. Provisional Application No. 60/994,296, filed Sep. 18, 2007 and German Patent Application No. 10 2007 044 389.9, filed Sep. 18, 2007, the entire disclosures of which are herein incorporated by reference.

FIELD OF THE INVENTION

The present invention relates to a structural component and to a fuselage of an aircraft or spacecraft which has a structural component of this type.

An important aspect of aircraft construction is the continuous attempt to reduce weight. On the one hand, this is achieved using particularly light-weight materials, for example CFRP materials, but on the other hand it is achieved using a basic structure which allows a high degree of flight safety or strength with a low weight.

Thus, in modern commercial aircraft, the basic structure of the fuselage is formed by the skin as well as by stringers and formers which are used to strengthen or reinforce the skin. In this respect, the stringers generally run in the longitudinal direction of the aircraft fuselage and the formers run in an encircling direction along the inner periphery of the skin. These structural components form the primary structure of the aircraft into which the secondary structures, for example engines, fittings, wiring etc. are incorporated.

Although a reduction in the number of primary structural components, for example stringers or formers would entail a reduction in weight, this would be to the detriment of the stability and thus to the safety of the flight.

It is therefore the object of the present invention to provide a structural component which allows weight to be reduced while the stability remains substantially the same in an aircraft or spacecraft.

SUMMARY OF THE INVENTION

This object is achieved according to the invention by a structural component which has the features of claim 1.

According thereto, a supporting component is provided to reinforce the skin of an aircraft or spacecraft, for example a stringer or former, this component being configured as a closed profile (hollow profile) so that a system medium can be conducted through the structural component. In this respect, the hollow profile itself acts as a load-bearing construction element.

The idea on which the present invention is based is to provide structural components in an aircraft or spacecraft with a double function. On the one hand, a structural component according to the invention acts as a primary structure, namely as a supporting component for reinforcing the fuselage of an aircraft or spacecraft. On the other hand, it serves to conduct a system medium between a source location and a target location in the aircraft. This makes it possible on the one hand to reduce weight and on the other hand to gain space, since the number of corresponding system lines can be reduced.

Advantageous embodiments and improvements of the invention are set out in the subclaims.

The term "structural component" as used herein is understood as meaning load-bearing primary structures, i.e. structures which are used to strengthen or reinforce the fuselage of an aircraft or spacecraft. Examples of such structural components include stringers and formers, in particular annular formers, but also pressure bulkheads.

The structural component can be attached to an inner side of a skin of the aircraft or spacecraft. This makes it possible for the system medium to be conducted in a space-saving manner along the inside of the skin.

According to a preferred development, the structural component has a receiving stand by which the structural component can be attached to the skin. A differential construction method of this type facilitates repairs, as it is possible to easily replace the individual components of the structural component.

In this respect, the receiving stand can comprise a foot portion which can be attached to the skin, and a receiving portion which is configured for receiving the hollow profile. Furthermore, the structural component can comprise a clamp by which the hollow profile is attached to the receiving stand.

The hollow profile preferably has an opening in a radial direction for introducing the system medium into and removing it from the hollow profile. The term "radial direction" as used in this context is understood as meaning a direction vertical to the longitudinal axis of the hollow profile. The longitudinal axis of the hollow profile is the axis along which the cross section of the hollow profile changes only marginally or only gradually.

In a development of the invention, provided in the opening is an adapter to which a line conducting the system medium can be connected. A line conducting the system medium can thus be easily connected to the hollow profile and the system medium can be conducted into and out of the hollow profile.

The system medium can be, for example a gas, a liquid, an electrical line or a glass fibre cable.

The hollow profile can be produced from a light metal, for example from titanium or aluminium. It is also possible to produce the hollow profile from a CFRP composite material.

The receiving stand can also be produced from a light metal, for example from titanium or aluminium or from a CFRP composite material.

As a light metal, titanium is particularly favourable due to its material characteristics.

The hollow profile can have a substantially circular cross section. This can be advantageous in particular for gaseous and liquid system media.

A fuselage or an airframe according to the invention of an aircraft or spacecraft comprises a skin and a structural component according to the invention which is attached to the inside of the skin.

BRIEF DESCRIPTION OF THE DRAWINGS

In the following, the invention will be described in detail based on embodiments with reference to the accompanying figures of the drawings.

DESCRIPTION OF EXEMPLARY EMBODIMENTS

Figure 1:
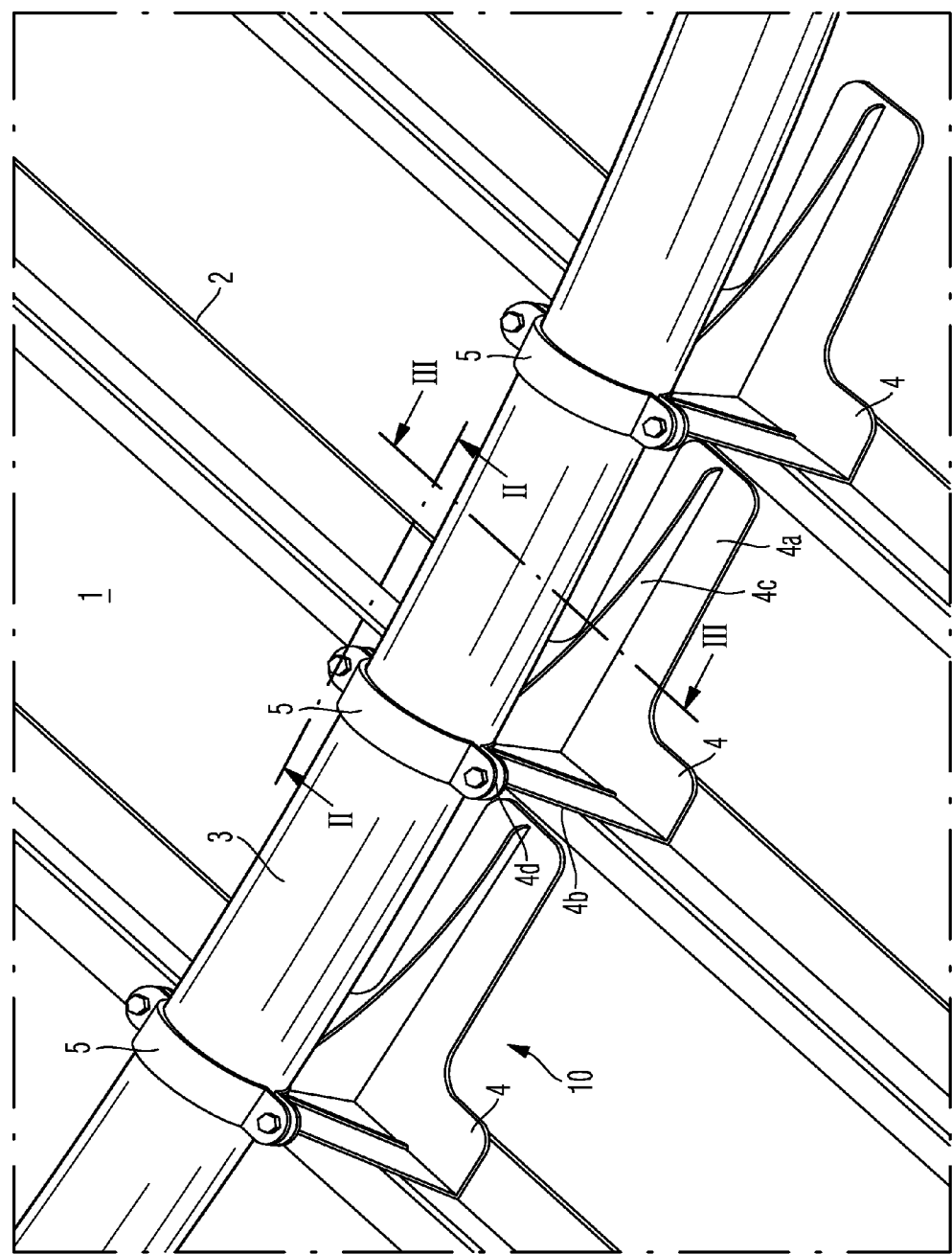
FIG. 1 is a perspective view of a structural component according to an embodiment of the present invention.

In the figures, the same reference numerals denote the same or functionally identical components, unless stated otherwise.

In the following, a structural component according to an embodiment of the invention will be described with reference to FIGS. 1 to 3.

FIG. 1 is a perspective view of a structural component 10. FIG. 2 shows a longitudinal section through the structural component 10 along line II-II in FIG. 1 and FIG. 3 shows a cross section through the structural component 10 along line III-III in FIG. 1.

Figure 2:
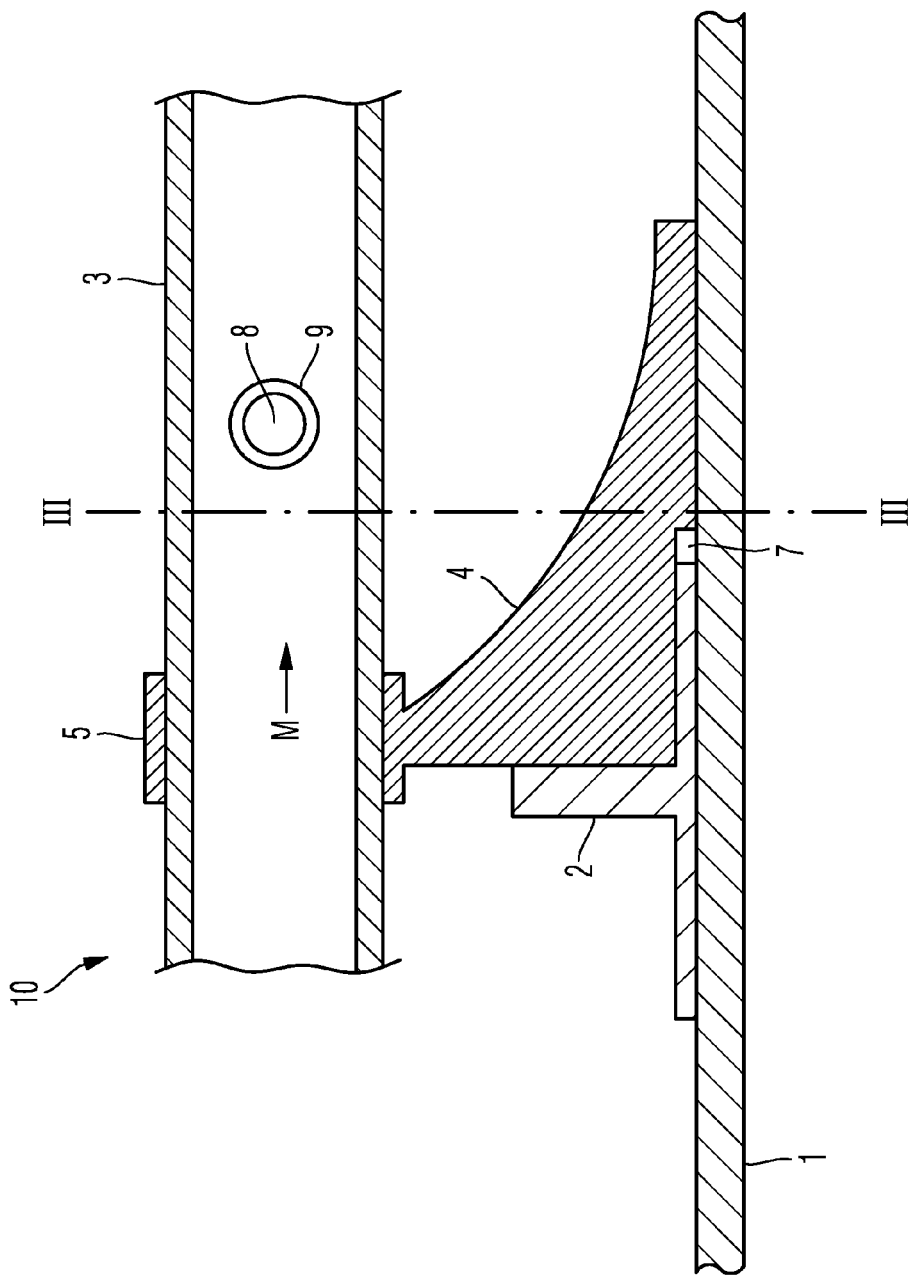
FIG. 2 is a longitudinal sectional view through a structural component according to an embodiment of the present invention along the line II-II in FIG. 1.
Figure 3:
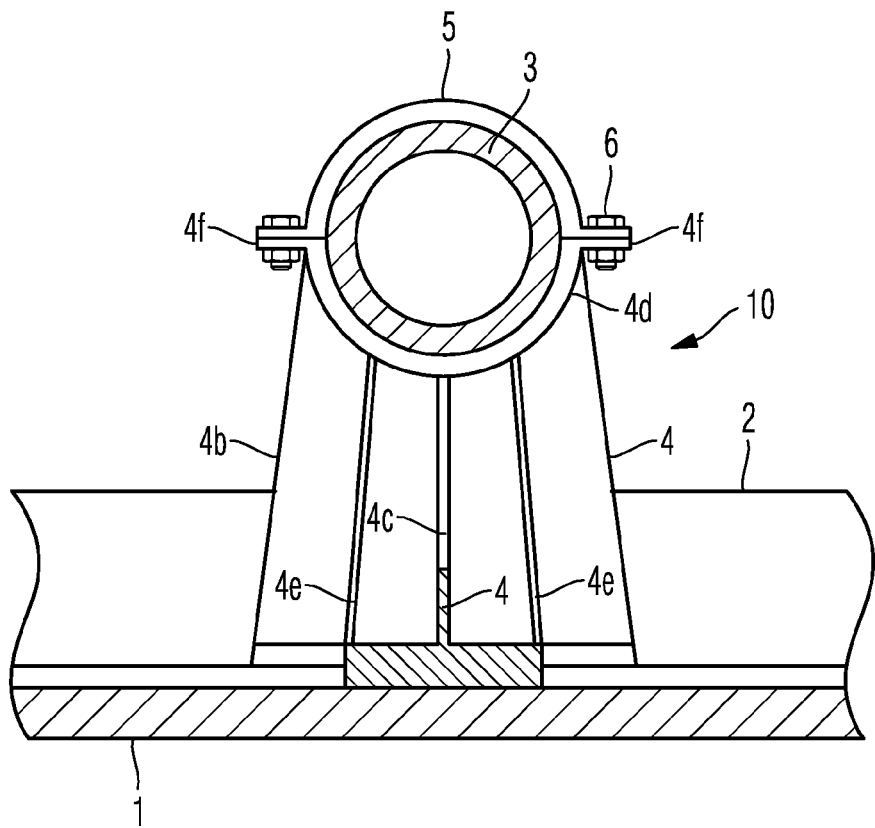
FIG. 3 is a cross-sectional view through the structural component in FIG. 2 along the line III-III in FIG. 1.

In the example shown in FIGS. 1 to 3, the structural component 10 is configured as a former assembly for strengthening or reinforcing the fuselage of an aircraft or spacecraft and comprises a hollow profile 3, receiving stands 4 and clamps 5.

The receiving stands 4 comprise a respective foot portion 4a, a wall portion 4b, a transverse rib 4c and a receiving portion 4d. The foot portion 4a is formed from a substantially T-shaped plate. A portion, opposite the wall portion 4b, on the free end of the T shape has a greater thickness than the portion facing the wall portion 4b, such that a step is formed on the lower side of the foot portion 4a, as shown in FIG. 2. The length of the foot portion 4a can be, for example approximately 100 mm and its width can be, for example approximately 80 mm.

The wall portion 4b extends substantially vertically to the foot portion 4a, more specifically from the upper end of the transverse beam of the T shape of the foot portion 4a. As shown in a plan view in FIG. 3, the wall portion 4b has a trapezoidal shape with a base edge adjoining the foot portion 4a, two side edges running towards one another and a rounded upper edge. The wall portion 4b is provided with two ribs 4e which are configured as thickenings in each case approximately centrally between the transverse rib 4c and the side edges 4b.

The receiving portion 4d joins the upper edge of the wall portion 4b. The receiving portion 4d is substantially in the shape of half a hollow cylinder, the inner radius of which is consistent with the outer radius of the hollow profile 3. A respective flange 4f is configured at both ends of the receiving portion 4d.

The transverse rib 4c is used to stabilise the receiving stand 4 and is configured vertically both to the foot portion 4a and to the receiving portion 4d. The transverse rib 4c extends along the entire length of the foot portion 4a, the height of the transverse rib 4c increasing from the free end of the foot portion 4a to the wall portion 4b. The upper edge of the transverse rib 4c is slightly curved upwards, which allows the weight to be further reduced. However, it is also possible for the upper edge of the transverse rib 4c to be straight.

The hollow profile 3 is accommodated in the receiving portion 4d of the receiving stand 4 and is secured therein by a clamp 5. The clamp 5 can be screwed, for example with the flanges 4f by screws 6. Thus, the hollow profile 3 can be easily secured in the receiving stand 4.

The receiving stand 4 can be attached to the skin 1 of the aircraft fuselage. Typically, the receiving stand 4 is riveted to the fuselage (not shown in the figures), which ensures a high degree of strength. For this, the foot portion 4a is positioned on the skin 1 and on a stringer 2 and is firmly riveted to the skin, stringer foot and stringer web. In this respect, the end of the foot portion 4a rests with the greater thickness on the skin 1 and the end of the foot portion 4a facing the wall portion 4b rests with the smaller thickness on the stringer 2. The wall portion 4b rests against the vertical web of the stringer 2.

The distance from the wall portion 4b to the step in the lower side of the foot portion 4a is greater than the distance from the stringer web to the side edge of the stringer 2, such that a cavity 7 is formed between the side edge of the stringer 2 and the lower side of the foot portion 4a. Thus a certain tolerance is achieved which makes it possible to compensate for inaccuracies in the configuration of the stringer 2.

A plurality of receiving stands 4 can be provided to attach the hollow profile to the fuselage of the aircraft, as shown in FIG. 1. Said receiving stands 4 can be arranged running around the inside of the fuselage and can receive therein a hollow profile 3 as an annular former which is curved along the inside of the fuselage. In this arrangement, the hollow profile 3 does not have to run around the inside of the fuselage as a complete unit, but can also be configured as one or more curved portions.

Advantageous in this respect is the differential structure which makes it possible for the individual components to be easily replaced or reused. Furthermore, the receiving stands 4 can be moved along the hollow profile 3, which allows a flexible use of the structural component in varying surroundings.

In the illustrated embodiment, the hollow profile 3 has a substantially circular cross section and can have an external diameter of, for example 40 mm. The hollow profile 3 is suitable for receiving at least one system medium M. Considered in this respect as a system medium are operating resources (i.e. liquids or gases) which are conducted purposefully to a specific location in the aircraft, as well as means for transmitting energy or signals. Examples of system media include gases, for example oxygen and air, liquids, for example water, fuel or oil, hydraulic lines, pneumatic lines, electrical lines, optical waveguides and the like.

The system medium M can be conducted in the hollow profile 3. For example, it can be introduced into the hollow profile 3 in a first location and removed from the hollow profile 3 in a second location which is at a distance from the first location by a specific rotation angle (for example 90° or 180°. Therefore, the hollow profile 3 fulfils the functions of a primary structure (as a supporting component) and of a secondary structure (as a system medium-conducting component). Consequently, it is possible to reduce the number of secondary structures, for example cable ducts or the like, thus allowing the aircraft weight to be reduced.

When the hollow profile 3 is used to receive a gas or liquid as the system medium, it is advantageous for said hollow profile 3 to be gastight or liquid-tight to avoid leaks.

The system medium M can be conducted in the hollow profile 3 directly (i.e. without additional lines). However, it is also possible to conduct the system medium M in a line through the hollow profile 3. In this case, the hollow profile 3 can perform an additional safety function. For example, it is conceivable to conduct fuel in a single-walled fuel line through the hollow profile 3. If the fuel line leaks, the hollow profile 3 can prevent the fuel from leaking out. In other words, the hollow profile 3 can perform the function of the outer wall of a double-walled fuel line.

To introduce and to remove the system medium, adapter stations can be provided which are at a distance from one another in the peripheral direction. In the simplest case, these adapter stations are configured as openings 8 in the hollow profile 3. It is also possible to introduce an insert 9 into these openings 8. An insert 9 of this type can be configured, for example as a rubber sleeve which acts as a cable guide and thus protects cables guided through the hollow profile 3 from being damaged. Furthermore, it is possible to configure the insert 9 as an adapter to which a line conducting a gas or a liquid can be connected.

It is also possible to provide dividing walls at opposite ends of the hollow profile 3 or also in portions thereof, which dividing walls restrict the flow of gases and liquids in the hollow profile 3.

Both the hollow profile 3 and the receiving stand 4 are typically made from a light metal, for example titanium or aluminium, but can also be produced from a carbon fibre reinforced composite material.

The hollow profile 3 can be produced, for example by extrusion. The receiving stand 4 can be produced, for example as a cast part or a forged part.

Although the present invention has been described above with reference to preferred embodiments, it is not restricted thereto, but can be modified in many different ways.

For example, in the above embodiment, the hollow profile 3 is attached to the skin 1 by receiving stands 4 which perform the function of clips. However, it is also possible to attach the hollow profile 3 directly to the skin 1 without receiving stands. For example, the hollow profile 3 can be riveted rigidly to the skin 1 by yokes.

Furthermore, the hollow profile 3 described above has a substantially circular cross section, which is particularly advantageous for the transport of liquid and gaseous system media. However, it is also possible to provide the hollow profile with a different cross section, for example a rectangular cross section.

Furthermore, the foot portion 4a in the embodiment described above is configured as a T-shaped plate, which is associated with a reduction in weight, but it can also be configured as a rectangular plate.

The structural component has been described above on the basis of a former assembly. However, the invention is not restricted thereto, and can also be applied to other structural components, for example stringers, pressure bulkheads and the like.

A supporting component (10) is provided for reinforcing the skin of an aircraft or spacecraft, for example a stringer or former, this component being configured as a closed profile (hollow profile) (3), such that a system medium (M) can be conducted through the structural component. In this respect, the hollow profile (3) itself serves as a load-bearing component.

LIST OF REFERENCE NUMERALS

1 skin
2 web
3 hollow profile
4 receiving stand
4a foot portion
4b wall portion
4c transverse rib
4d receiving portion
4e rib
4f flange
5 clamp
6 screw
7 cavity
8 opening
9 insert
10 structural component

The invention claimed is:

1. A structural component which is a load-receiving former for reinforcing a skin of an aircraft or spacecraft, the structural component comprising a closed hollow profile for receiving at least one system medium such that the system medium can be introduced into the hollow profile in a first location and removed from the hollow profile in a second location which is at a distance from the first location, wherein the structural component has a receiving stand by which the structural component can be attached to the skin, the receiving stand has a foot portion which can be positioned on the skin and can be attached to the skin, and a receiving portion which is configured for receiving the hollow profile.

2. The structural component according to claim 1, wherein the structural component is an annular former.

3. The structural component according to claim 2, wherein the structural component also has a clamp by which the hollow profile is attached to the receiving stand.

4. The structural component according to claim 2, wherein the receiving stand is produced from titanium.

5. The structural component according to claim 1, wherein the structural component can be attached to an inner side of the skin of the aircraft or spacecraft.

6. The structural component according to claim 1, wherein the hollow profile has an opening in a radial direction for introducing the system medium into and removing it from the hollow profile.

7. The structural component according to claim 6, wherein provided in the opening is an adapter to which a line conducting the system medium can be connected.

8. The structural component according to claim 1, wherein the system medium is a gas, a liquid, an electrical line or a glass fibre cable.

9. The structural component according to claim 1, wherein the hollow profile is produced from titanium.

10. The structural component according to claim 1, wherein the hollow profile has a substantially circular cross section.

11. A fuselage of an aircraft or spacecraft, wherein the fuselage has a skin and a structural component according to claim 1, which structural component is attached to the inside of the skin.

\* \* \* \* \*